July 8, 1958  H. F. LYMAN  2,842,144
DISHWASHING MACHINE RINSING APPARATUS
Filed April 20, 1953  2 Sheets-Sheet 1

INVENTOR
HOMER F. LYMAN
BY
E. Francis Wentworth Jr.
ATTORNEY

July 8, 1958
H. F. LYMAN
2,842,144
DISHWASHING MACHINE RINSING APPARATUS
Filed April 20, 1953
2 Sheets-Sheet 2
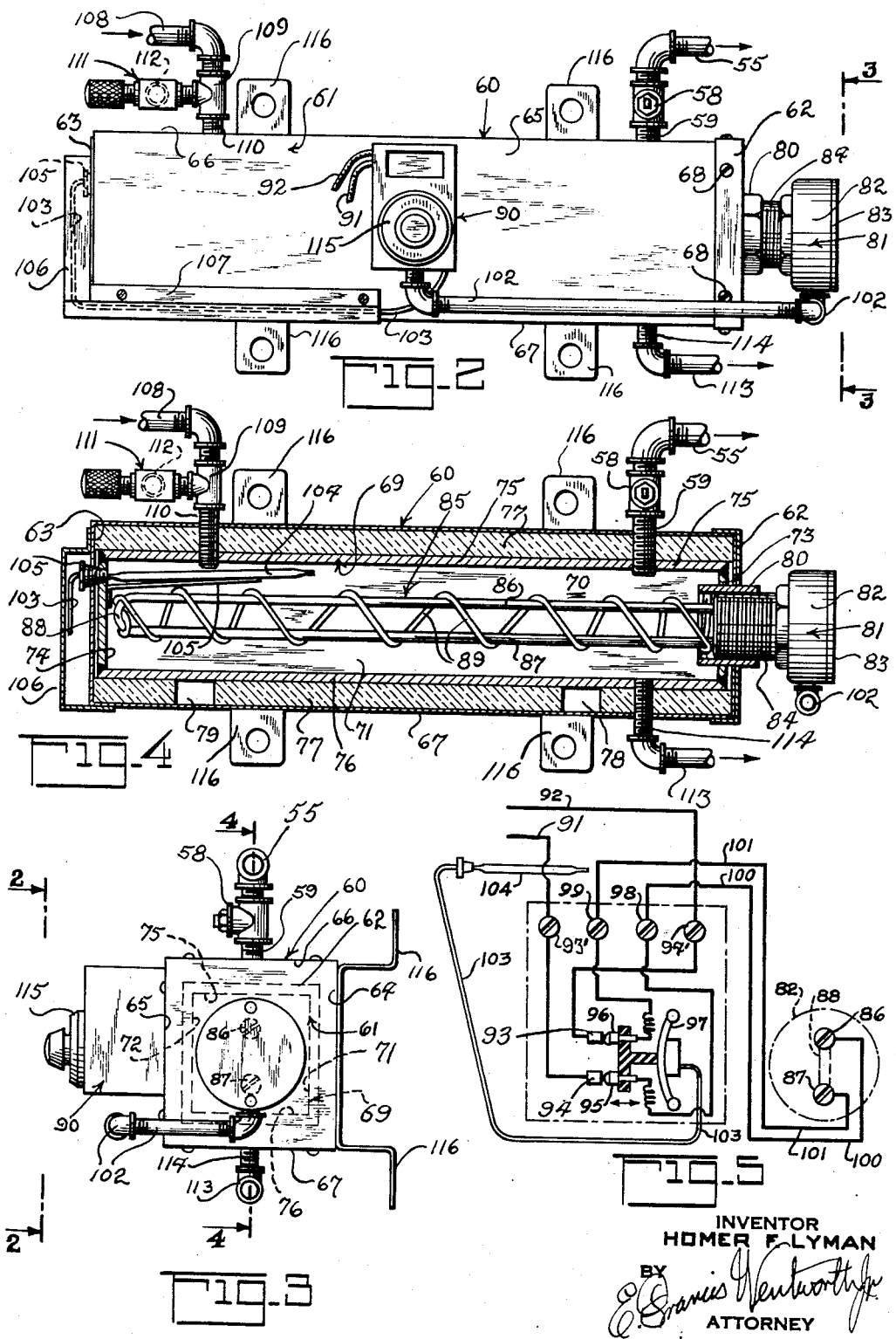
INVENTOR
HOMER F. LYMAN
BY
E. Francis Wentworth Jr.
ATTORNEY

United States Patent Office 2,842,144
Patented July 8, 1958

2,842,144

DISHWASHING MACHINE RINSING APPARATUS

Homer F. Lyman, Nutley, N. J.

Application April 20, 1953, Serial No. 349,863

5 Claims. (Cl. 134—57)

This invention relates to dishwashing and rinsing machines and particularly to dishwashing and rinsing machines of the commercial type, as distinguished from those used in the household, and in which dishes, in accordance with various health laws and regulations, must be washed and rinsed in water of a specified temperature.

In dishwashing machines of the type to which the present invention relates, a rack of dishes is washed and thereafter rinsed in a washing chamber enclosed within the machine. The dishes are washed by a plurality of sprays of wash-water directed downwardly upon the dishes from a plurality of spray pipes above the rack and directly upwardly from a plurality of spray pipes disposed below the rack. Wash-water is pumped into the spray pipes by a circulating pump which receives the water from a tank compartment below the spray pipes. The pump is driven by an electrical motor. After the washing operation is completed, the dishes are rinsed by rinse-water which is sprayed downwardly onto the dishes from a rinse-water spray pipe and upwardly onto the dishes from other rinse spray pipes disposed below the rack of dishes. The upper and lower rinse spray pipes receive rinse-water from a source of heated water through a valve-controlled conduit.

Health regulations normally require that the final rinse water temperatures in such dishwashing and rinsing machines should be at a degree substantially higher than that of the temperature of the wash-water so that any bacteria will be destroyed in the final rinse operation. Small restaurants or other users of the commercial type of dishwashing and rinsing machines to which this invention relates are faced with the problem of installing expensive equipment to meet said regulations and requirements.

The present invention provides a compact, self-contained electric booster unit for heating rinse water for a dishwashing and rinsing machine to a predetermined temperature which booster unit is readily installed when the machine is assembled or which can be provided as a separate unit and installed on a commercial dishwashing and rinsing machine of the type hereinabove described which machine is already in use.

The electric, water temperature booster unit of the present invention comprises a relatively small water heating tank or reservoir inserted in a metallic casing, preferably of welded steel, which tank is packed in an insulating material in a space between the metallic casing and the tank. Within the tank, is a thermostatically controlled electric immersion heater unit which unit is so mounted as to be readily removable for cleaning in the event of corrosion due to hard water conditions. The water inlet to the unit is normally connected to a source of hot water, for example a hot water supply line providing water at a temperature of 140° F., while the water outlet of the unit is in communication with the rinse spray pipes of the dishwashing and rinsing machines to supply water at a higher temperature to said rinse spray pipes. For example, with the present invention, sufficient rinse water at 180° F. will be provided to rinse a basket of dishes in said machine for a ten (10) second rinse cycle out of every minute. The booster of the present invention is also provided with an adjustable thermostatic control to control the degree to which the water in the water tank is heated and also is provided with a safety blow-off valve.

The invention will be understood from the following description when considered in connection with the accompanying drawing in which:

Fig. 2 is a side elevational view of the electric water temperature booster unit of the present invention taken on the line 2—2 of Fig. 3;

Fig. 3 is an end elevational view taken on the line 3—3 of Fig. 2;

Fig. 4 is a longitudinal sectional view of the booster unit illustrated in Fig. 1 and taken on the line 4—4 of Fig. 3; and Fig. 5 is a wiring diagram of the electrical connections to the thermostatic control switch and from said control switch to the heating elements of the booster unit.

Like characters of reference refer to like parts throughout the several views.

Figure 1:
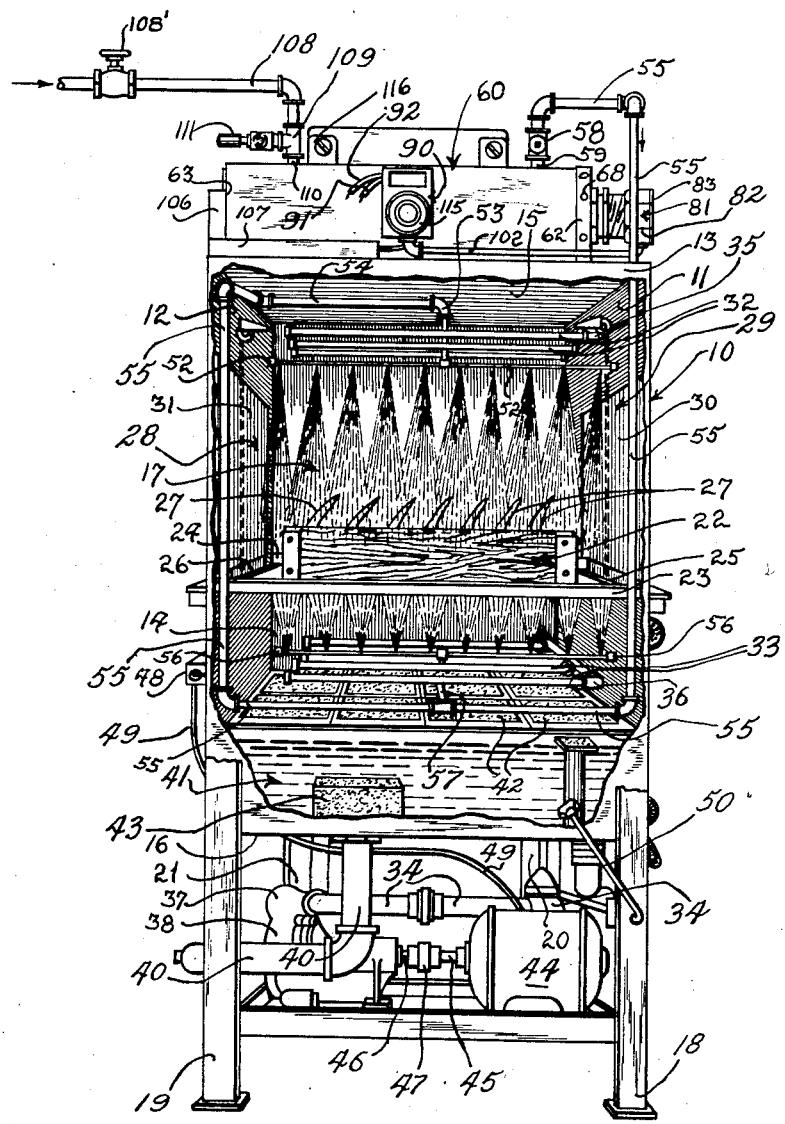
Fig. 1 is a side elevational view of a dishwashing and rinsing machine embodying the present invention, parts of the casing being broken away, the dishwashing and rinsing machine being illustrated in its dish rinsing cycle.

Referring to Fig. 1 of the drawings, the reference numeral 10 designates the casing of the dishwashing and rinsing machine, which casing is substantially rectangular in cross-section. The casing 10 comprises opposite end walls 11 and 12, opposite side walls 13 and 14, a top 15 and a bottom 16 forming therebetween a washing and rinsing chamber 17. The opposite end walls and the opposite side walls adjacent thereto are secured together preferably by welding and the top and bottom are welded to the sides and ends so that the washing and rinsing chamber 17 is water-tight. Casing 10 is supported on logs 18, 19, 20 and 21 which legs each comprise L-shaped angle bars. Each of the legs is secured to the casing at a corner formed by joining of the opposite sides of the casing and the opposite ends thereof.

A table adapted to support a dish rack 22 is positioned in chamber 17 substantially intermediate the top 15 and bottom 16 of the dishwashing machine. The table comprises spaced L-shaped angle bars 23 and 24 extending between opposite end walls 11 and 12 adjacent to and in spaced relationship with the opposite side walls 13 and 14. Angle bars 23 and 24 are secured at one end thereof to a support 25 projecting along the end wall 11 between the side walls 13 and 14 and at the opposite end thereof to a support 26 extending along the end wall 12 between said side walls. Rack 22, in the embodiment of the invention illustrated, comprises an elongated tray open at the top and at the bottom thereof and having a plurality of supporting means for dishes 27 so arranged as to support the dishes in a plurality of spaced rows extending internally of the tray. The rack 22 may be inserted in chamber 17 either through the opening 28 in the end wall 12 or the opening 29 in the end wall 11. Opening 29 is closed by a door 30 while the opening 28 is closed by a door 31.

Dishes 27 are washed by directing streams of washing liquid under pressure on them from a plurality of wash spray pipes 32 positioned in the chamber 17 above the rack 22 so as to direct streams of water downwardly onto the dishes in said rack and by lower spray pipes 33 disposed below the rack of dishes so as to direct streams of wash-water upwardly and over said dishes in the rack 22. Upper spray pipes 32 receive wash-water from wash-water conduit 34 through a connecting pipe 35 while lower spray pipes 33 receive wash-water through a connecting pipe 36 which communicates with said wash-water conduit 34. Wash-water conduit 34 is in communication with the outlet 37 of the pump 38, the suction (not shown) of which pump communicates through a conduit 40 with a wash-water tank 41 within the casing 10 of the dish-washing and rinsing machine in the lower part thereof below lower spray pipes 33. Intermediate spray pipes 33 and wash-water tank 41 is a straining screen 42 through which wash-water from upper spray pipes 32 and lower spray pipes 33, after flowing into contact with the dishes in rack 22, passes into tank 41. A strainer 43 is positioned over the inlet of conduit 40 so that foreign substance from tank 41 will not pass into said conduit and into pump 38.

Pump 38 is actuated by an electrical motor 44, the shaft 45 of which is connected to a pump shaft 46 through a coupling 47. Motor 44 is electrically connected to a manually operated wash switch 48 by an electrical conduit 49. Wash control handle 50 controls the flow of wash-water through conduit 34 to the wash spray pipes.

After washing of the dishes is completed, as will hereinafter be described, the dishes in rack 22 are rinsed by streams of rinse-water directed downwardly thereover from an upper rinse pipe 52 which pipe is revolved from a center connection 53 by force of rinse-water flowing into the upper pipe 52 through a connecting pipe 54 which pipe communicates with a main rinse conduit 55. A lower rinse water spray pipe 56 is disposed below rack 22 and projects streams of rinse-water upwardly over the dishes in rack 22. The lower rinse pipe 56 revolves in a manner similar to upper pipe 52. Lower rinse water pipe 56 communicates with main rinse conduit 55 through a lower connecting pipe 57.

Main rinse conduit 55 is connected to an outlet valve 58 which valve controls the flow of heated water from outlet 59 of water temperature booster 60 mounted, as shown in Fig. 1, on the top 15 of the casing 10 of said dishwashing and rinsing machine.

As illustrated more specifically in Figs. 2 to 4 inclusive, the water temperature booster 60 comprises a rectangular-shaped metallic casing 61 having a removable end cover 62, an end 63, opposite sides 64 and 65, a top 66 and bottom 67. The cap 62 is removably secured to the casing by screws 68 (Fig. 2). Within casing 61, is a reservoir or water tank 69 enclosing a water heating chamber 70. Tank 69 is also of rectangular-shape having opposite sides 71 and 72, opposite ends 73 and 74, a top 75 and a bottom 76. The various sides and ends, top and bottom of the tank are secured in water-tight relationship to one another, for example, by welding. Tank 69 is of such size that the opposite sides 71 and 72 thereof are in spaced relationship respectively with the opposite sides 64 and 65 of the booster casing while the top 75 and bottom 76 of the tank are in spaced relationship respectively with the top 66 and bottom 67 of said booster casing. The space between the opposite sides of said tank and the opposite sides of the booster casing, the space between the top of the tank and top of the casing and the space between the bottom of the tank and bottom of the casing is packed with insulating material 77. Tank 69 rests upon spacers 78 and 79 (Fig. 4).

End 73 of tank 69 has a cylindrically-shaped, screw-threaded internal fitting 80 secured thereto and extending therethrough, the fitting being of such length as to extend into the water chamber 70 and outwardly of cap 62.

A heating unit mounting 81 comprising a connector head 82 having a removable cover 83 thereon is detachably mounted in fitting 80 by means of a screw-threaded extension 84 the threads of which engage the internal threads in the fitting. A substantially U-shaped heating element 85 (Fig. 4) of electrical resistance material is mounted within heating unit mounting 81 and has opposite legs 86 and 87, which legs extend longitudinally of water heating chamber 70 and are connected by a curved end portion 88. The legs 86 and 87 extend through extension 84 and are insulated therefrom by insulating packing, not shown, said legs being anchored in connector head 82. As illustrated in Fig. 4, a zinc wire 89 is wound around the legs 86 and 87 of element 85 to prevent corrosion of heating element 85. Through reaction of zinc and the water being heated, a lime encrustation is prevented from forming on legs 86 and 87 of element 85.

A thermostatically controlled switch 90 controls the flow of electricity to element 85. Switch 90 which is illustrated diagrammatically in Fig. 5 may be of any well-known type thermostatic double pole, single throw switch having a switch mechanism, preferably of snap action actuated by a diaphragm which diaphragm is responsive to the contraction and expansion of liquid, for example, mercury in a bulb conducted to the diaphragm through capillary tubing.

Thermostatic switch 90 receives electricity from opposite poles of an electric source through leads 91 and 92 connected to stationary contacts 93 and 94. Movable contacts 95 and 96, which are movable into and out of contact with fixed contacts 93 and 94 by diaphragm 97, are connected to connections 98 and 99. Connections 98 and 99 are connected, in connector head 82, with opposite legs 86 and 87 of element 85 through leads 100 and 101 in a tubular conduit 102. Diaphragm 97 is responsive to the expansion and contraction of liquid, for example mercury, through capillary tube 103 which communicates at one end thereof with said diaphragm and at the opposite end with a bulb 104 (Fig. 4) extending into water chamber 70. Bulb 104 rests upon support 105 attached to end 74 of the water tank and is mounted on end 74 by means of screw-threaded plug 105. Capillary tube 103 is protected by end shield 106 and side shield 107.

Water to be heated in booster 60, enters water heating chamber 70 through inlet conduit 108 controlled by valve 108'. The inlet conduit is connected to a T-connection 109 which T-connection communicates with chamber 70 through a screw-threaded nipple 110. A safety blow-off valve 111 is in communication with the T-connection and through said connection with chamber 70 and is adapted to blow-off if the pressure in chamber 70 exceeds a predetermined maximum. Safety valve 111 is adapted at 112 to be connected to a drain, not shown.

Chamber 70 may be drained through a drain pipe 113 which pipe communicates with the tank through a screw-threaded nipple 114 and is valve controlled (not shown).

Water booster 60 has a plurality of mounting lugs 116 thereon.

In operation, when it is desired to wash and rinse a rack 22 of dishes 27, the rack is positioned within washing and rinsing chamber 17 and supported on angle bars 23 and 24 of the supporting table within the chamber. Openings 28 and 29 in the opposite end walls of the dishwashing and rinsing machine are thereafter closed by closing doors 30 and 31, respectively. The dishes are then washed by setting switch 48 in its "on" position so that electrical current flows from an electrical source to motor 44. Motor 44 is thusly set in operation which drives pump 38 through shaft 45, connection 47 and shaft 46. Wash-water from wash-water tank 41 within the dishwashing and rinsing apparatus is caused to flow through strainer 43 into suction conduit 40 through pump 38 and then is forced under pressure into wash-water conduit 34 whence it passes through connecting pipe 36 into the lower spray pipes 33 and from connecting pipe 35 into upper wash spray pipes 32. Sprays of water under pressure are thereby directed upwardly onto dishes in rack 22 from lower spray pipes 33 and downwardly under pressure onto said dishes through upper spray pipes 32. This operation is continued until the dishes are washed at which time switch 48 is turned to its "off" position preventing flow of electrical current to motor 44 which stops operation of the washing apparatus.

After the dishwashing operation is completed, the dishes are rinsed by opening rinse control valve 108' in inlet conduit 108 permitting preheated rinse water to enter and fill water heating chamber 70 of tank 69 through conduit 108, T-connection 109 and nipple 110. While water heating chamber 70 is being filled with water, outlet valve 58 is in its open position so that air will be released from said chamber. When chamber 70 is filled, rinse control valve 108' and outlet valve 58 are both closed. The water in chamber 70 is then heated to a desired predetermined temperature.

Heating of rinse water to said desired temperature and maintenance of the water at that temperature is accomplished through thermostatically controlled switch 90. Dial 115 of switch 90 is set at a predetermined temperature, for example 180° F. Since the rinse water entering chamber 70 is at a temperature less than the desired rinsing temperature, diaphragm 97, which is responsive to the temperature of the water in chamber 70 through bulb 104 and capillary tube 103, will be in the position shown diagrammatically in Fig. 5 wherein movable contacts 95 and 96 are in contact with fixed contacts 93 and 94 respectively. Electrical current from opposite poles of an electrical source flows through lines 91 and 92, connections 93' and 94' into fixed contacts 93 and 94 respectively of switch 90 (see Fig. 5). From movable contacts 95 and 96, the electrical current then passes through connections 98 and 99 respectively into leads 100 and 101 respectively thence through said leads into opposite legs 86 and 87 respectively of heating element 85 through connections in connector head 82. Heating element 85 is thereby electrically heated and heats the water in chamber 70. When the rinse water in chamber 70 reaches the desired temperature, which ordinarily requires approximately five minutes, valve 58 is opened a desired amount.

After the dishwashing cycle is completed, rinsing control valve 108' is opened for a predetermined length of time permitting water to flow through inlet 108 into chamber 70. The length of time the rinsing valve is permitted to be opened and the time of opening of said valve may be automatically determined by any well-known means or may be determined by an operator and the rinse valve may be automatically opened and closed by means well-known in the art or manually by the operator. Flowing of rinse water into chamber 70 causes rinse water heated to the predetermined desired temperature to flow through outlet 59, valve 58 thence into main rinse conduit 55. From conduit 55 the heated rinse water flows into lower rinse pipe 56 through connecting pipe 57 and into upper rinse pipe 52 through connecting pipe 54. After rinsing of the dishes is completed, rinse control valve 108' is closed causing further cessation of flow of heated rinse water from chamber 70 through outlet 59. With the present invention, sufficient rinse water, by way of example, at 180° F. will be provided to rinse a basket of dishes in a dishwashing and rinsing machine for a ten (10) second rinse cycle out of every minute.

Should the temperature of the rinse water in chamber 70 exceed the predetermined desired temperature, for example should the temperature of said rinse water reach a maximum of 190° F., such maximum temperature is detected by the bulb 104 and through the mercury in capillary tube 103 causes the diaphragm to move to the right, Fig. 5, thereby moving movable contacts 95 and 96 out of contact with fixed contacts 93 and 94 respectively preventing the flow of electricity from leads 91 and 92 to leads 100 and 101 and into heating element 85. When the temperature of the rinse water in chamber 70 drops to or below the desired temperature, such drop of temperature will be detected by bulb 104 and diaphragm 97 will respond to such drop through capillary tube 103 and move to the position shown in Fig. 5, which position is hereinabove described, so that electricity will be conducted to heating element 85 and rinse water in chamber 70 will be returned to or maintained at the desired rinsing temperature.

Should the pressure within chamber 70 exceed a predetermined value blow-off valve 111 will operate, moving to its opened position thereby relieving such pressure. When the pressure within chamber 70 returns to normal, valve 111 will return to its normally closed position.

Chamber 70 of tank 69 may be drained, when not in use, through drain 113.

When it is desired to clean heating element 85, it is merely necessary to disconnect leads 100 and 101 and conduit 102 from connecting head 82. Head 82 and screw-threaded extension 84 are then turned so that extension 84 is unscrewed from fitting 80 and element 85 is thereby withdrawn from chamber 70 through fitting 80 and thereafter readily cleaned.

Tank 69 may be removed from casing 61 by unscrewing outlet 59, plug 105 and nipples 110 and 114 from said tank and removing cover 62 from casing 61. Tank 69 is then slide outwardly of the casing through the uncovered end thereof.

It will be noted that the rinse water in a commercial dishwashing and rinsing machine is readily, economically and safely heated to a desired temperature and maintained at said temperature in accordance with the present invention. The rinse water temperature booster of this invention is also easily and simply maintained and the parts thereof are replaceable with a minimum of skill and effort.

Inasmuch as various modifications may be made in the form of the invention herein disclosed and in the location and relative arrangement of the several parts of the invention without departing from the principles thereof, it will be understood that the invention is not to be limited excepting by the scope of the appended claims.

What is claimed is:

1. In dishwashing and rinsing apparatus having an area in which dishes are washed and thereafter rinsed, means for directing washing fluid onto the dishes, other means for directing rinsing fluid onto the dishes, means for delivering washing fluid to said means for directing washing fluid, washing fluid-flow control means for controlling the operation of said washing fluid delivering means, a rinsing fluid temperature booster comprising an elongated substantially horizontally extending fluid tank normally filled with rinsing water, inlet conduit means in communication with said tank adjacent one end thereof and with a source of rinsing fluid so as to conduct rinsing fluid from the source to the tank, rinse fluid-flow control means for controlling the flow of rinse fluid through said inlet conduit means, outlet conduit means in communication with said tank adjacent the end of the tank opposite said one end and so as to receive heated water therefrom, said outlet conduit also being in communication with said other means for directing rinsing fluid onto the dishes so as to conduct heated fluid from said tank to said other means, an elongated substantially horizontally extending electrical heating element so disposed in the tank that fluid in the tank flows in heat exchange relationship with the element in passing from said one end of the tank to said opposite end thereof, a thermostatically controlled electrical switch having one contact means in communication with a source of electricity and other contact means in communication with said heating element, the one contact means and other contact means being movable into and out of engagement with one another, and temperature responsive means responsive to the temperature of the fluid in said tank and operatively associated with said switch and so constructed and arranged as to move the one contact means and the other contact means out of engagement with one another when the temperature of the fluid in the tank exceeds a predetermined maximum temperature and to move said one contact means and said other contact means into engagement when the temperature of the fluid in said tank drops below a predetermined minimum.

2. The apparatus set forth in claim 1 wherein the rinsing fluid temperature booster comprises an outer casing around said tank, said casing having opposite sides, a top, a bottom and opposite ends, one of said opposite ends being removably mounted on the casing, said casing being of such size and shape that the tank within the casing is in spaced relationship with said opposite sides, top and bottom of the casing, means for removably mounting said tank in the casing, and wherein said inlet conduit means and said outlet conduit means are removably connected to said tank.

3. The apparatus set forth in claim 1 wherein the rinsing fluid temperature booster comprises an outer casing around said tank, the casing having opposite sides, a top, a bottom and opposite ends, the casing being of such size and shape that the tank within the casing is in spaced relationship with said opposite sides, top and bottom of the casing, and means for removably mounting said casing on the dishwashing and rinsing machine.

4. In dishwashing and rinsing apparatus having an area in which dishes are washed and thereafter rinsed, means for directing washing fluid onto the dishes, other means for directing rinsing fluid onto the dishes, means for delivering washing fluid to said means for directing washing fluid, washing fluid-flow control means for controlling the operation of said washing fluid delivering means, a rinsing fluid temperature booster comprising an elongated substantially horizontally extending casing, a fluid tank mounted within the casing and normally filled with rinsing water, the relative size and shape of the tank and casing being such that the tank is in spaced relationship with the casing, insulating material in the space between the tank and the casing, means for removably mounting said casing on the dishwashing and rinsing machine with the longitudinal axis thereof in a substantially horizontal plane, inlet conduit means in communication with said tank adjacent one end thereof and a source of rinsing fluid so as to conduct rinsing fluid from the source to the tank, rinse fluid-flow control means for controlling the flow of rinse fluid through the inlet conduit means, outlet conduit means in communication with said tank adjacent the end of the tank opposite said one end and also the top thereof at a position to receive heated water therefrom and also in communication with said other means for directing rinsing fluid onto the dishes so as to conduct heated rinsing fluid thereto, an elongated electrical heating element extending longitudinally of said tank in a substantially horizontal plane, mounting means for removably mounting said element in relationship to one end of the tank and casing, a thermostatically controlled electrical switch mounted on the outside of said casing and having one contact means in communication with a source of electricity and other contact means in communication with said heating element, the one contact means and other contact means being movable into and out of engagement with one another, and temperature responsive means responsive to the temperature of the fluid in said tank and operatively associated with said switch and so constructed and arranged as to move the one contact means and the other contact means out of engagement with one another when the temperature of the fluid in the tank exceeds a predetermined maximum temperature and to move said one contact means and said other contact means into engagement when the temperature of the fluid in said tank drops below a predetermined minimum.

5. The apparatus set forth in claim 4 wherein the tank is removably mounted within the casing and wherein the rinse fluid inlet conduit and rinse fluid outlet conduit are detachably connected to said tank.

References Cited in the file of this patent

UNITED STATES PATENTS

| 1,528,069 | Merseles | Mar. 3, 1925 |
| 1,844,268 | Alex | Feb. 9, 1932 |
| 1,920,284 | Wells | Aug. 1, 1933 |
| 1,995,331 | Snyder et al. | Mar. 26, 1935 |
| 2,167,940 | Erickson | Aug. 1, 1939 |
| 2,197,382 | Murphy | Apr. 16, 1940 |
| 2,269,448 | Ferris | Jan. 13, 1942 |
| 2,307,363 | Dunham | Jan. 5, 1943 |
| 2,434,928 | Hill | Jan. 27, 1948 |
| 2,494,654 | Glynn | Jan. 17, 1950 |
| 2,671,455 | MacDonald et al. | Mar. 9, 1954 |